United States Patent
Bauer et al.

(10) Patent No.: US 11,226,265 B2
(45) Date of Patent: Jan. 18, 2022

(54) VEHICLE TEST STAND AND METHOD FOR ASCERTAINING A VEHICLE LONGITUDINAL ACCELERATION

(71) Applicant: KRISTL, SEIBT & CO. GESELLSCHAFT M.B.H., Graz (AT)

(72) Inventors: Robert Bauer, Graz (AT); Wilfried Rossegger, Graz (AT)

(73) Assignee: KRISTL, SEIBT & CO. GESELLSCHAFT M.B.H., Graz (AT)

( * ) Notice: Subject to any disclaimer, the term of this patent is extended or adjusted under 35 U.S.C. 154(b) by 239 days.

(21) Appl. No.: 16/616,951

(22) PCT Filed: May 25, 2018

(86) PCT No.: PCT/AT2018/060106
§ 371 (c)(1),
(2) Date: Nov. 25, 2019

(87) PCT Pub. No.: WO2018/213862
PCT Pub. Date: Nov. 29, 2018

(65) Prior Publication Data
US 2020/0249127 A1    Aug. 6, 2020

(30) Foreign Application Priority Data

May 26, 2017  (AT) .............................. A 50444/2017

(51) Int. Cl.
*G01M 17/007*     (2006.01)
*G01P 15/00*      (2006.01)

(52) U.S. Cl.
CPC ........... *G01M 17/007* (2013.01); *G01P 15/00* (2013.01)

(58) Field of Classification Search
CPC .. G01M 17/007; G01M 17/0072; G01P 15/00
See application file for complete search history.

(56) References Cited

U.S. PATENT DOCUMENTS 4,169,730 A     10/1979  Iwase et al.
4,455,866 A  *   6/1984  Barrigar ............ G01M 17/0074
                                                    73/116.07

(Continued)

FOREIGN PATENT DOCUMENTS

EP        0846945 A2     6/1998
EP        1085312 A2     3/2001
WO     2015157788 A1    10/2015

OTHER PUBLICATIONS

Pillas, J. et al, "Model-based load change reaction optimization using vehicle drivetrain test beds," Proceedings of the 2014 Internationales Stuttgarter Symposium, Mar. 18, 2014, Stuttgart, Germany, 11 pages.

(Continued)

*Primary Examiner* — Freddie Kirkland, III
(74) *Attorney, Agent, or Firm* — McCoy Russell LLP

(57) ABSTRACT

A method and vehicle test stand comprising at least one actuator for moving the vehicle in a longitudinal direction. During the test, a rotational movement which is carried out by a wheel or a powertrain of the vehicle is measured in real time, a longitudinal acceleration corresponding to the measured rotational movement is ascertained, and the at least one actuator is actuated based on the ascertained longitudinal acceleration. In at least one example, the vehicle may be connected to an acceleration sensor, an acceleration signal of the acceleration sensor is detected during the test and a low-frequency longitudinal acceleration component is calculated based on the ascertained longitudinal acceleration and a position control loop for controlling the actuator, and the vehicle longitudinal acceleration is ascertained based on the detected acceleration signal and the calculated low-frequency longitudinal acceleration component.

8 Claims, 6 Drawing Sheets

(56) References Cited

U.S. PATENT DOCUMENTS

| | | | | |
|---|---|---|---|---|
| 5,111,685 A | * | 5/1992 | Langer | G01M 17/0074 |
| | | | | 73/118.01 |
| 6,598,467 B1 | | 7/2003 | Schöggl et al. | |
| 7,926,337 B2 | * | 4/2011 | Inoue | G01M 17/0074 |
| | | | | 73/116.08 |
| 8,186,207 B2 | * | 5/2012 | Litz | G01M 17/0074 |
| | | | | 73/116.07 |
| 8,607,626 B2 | * | 12/2013 | Litz | G01M 9/062 |
| | | | | 73/116.07 |
| 8,788,116 B2 | * | 7/2014 | Litz | G05D 1/0238 |
| | | | | 701/2 |
| 9,612,179 B2 | * | 4/2017 | Hemerson | G01M 17/0074 |
| 9,841,351 B2 | * | 12/2017 | Reiter | G01M 13/025 |
| 10,241,008 B2 | * | 3/2019 | Kaneko | G01M 17/0074 |
| 10,732,076 B2 | * | 8/2020 | Takahashi | G01M 17/0074 |
| 11,060,954 B2 | * | 7/2021 | Takahashi | F16P 1/00 |
| 2016/0313214 A1 | * | 10/2016 | Takahashi | G01M 17/0072 |
| 2017/0038274 A1 | * | 2/2017 | Reiter | G01M 17/04 |

OTHER PUBLICATIONS

ISA European Patent Office, International Search Report Issued in Application No. PCT/AT2018/060106, dated Aug. 1, 2018, WIPO, 4 pages.

\* cited by examiner

VEHICLE TEST STAND AND METHOD FOR ASCERTAINING A VEHICLE LONGITUDINAL ACCELERATION

CROSS-REFERENCE TO RELATED APPLICATIONS

The present application is a U.S. National Phase of International Patent Application Serial No. PCT/AT2018/060106 entitled "VEHICLE TEST STAND AND METHOD FOR ASCERTAINING A VEHICLE LONGITUDINAL ACCELERATION," filed on May 25, 2018. International Patent Application Serial No. PCT/AT2018/060106 claims priority to Austrian Patent Application No. A 50444/2017 filed on May 26, 2017. The entire contents of each of the above-referenced applications are hereby incorporated by reference for all purposes.

The invention lies in the field of assessment of a vehicle application, in particular the driveability of a motor vehicle. In an assessment of this kind the parameter of vehicle longitudinal acceleration is of particular importance in various situations of the driving mode.

The invention relates in this respect to a method for ascertaining a vehicle longitudinal acceleration (or a vehicle longitudinal acceleration signal) during a test of a vehicle in a vehicle test stand, comprising at least one actuator for moving the vehicle in a longitudinal direction, wherein, during the test, a rotational movement which is carried out by a wheel or a powertrain of the vehicle is measured in real time, a longitudinal acceleration corresponding to the measured rotational movement is ascertained, and the at least one actuator is actuated based on the ascertained longitudinal acceleration.

The invention additionally relates to a vehicle test stand for ascertaining a vehicle longitudinal acceleration (or a vehicle longitudinal acceleration signal) during a test of a vehicle, with a measuring device for measuring a rotational movement of a wheel or of a powertrain of the vehicle, with an actuator for moving the vehicle in a longitudinal direction, and with a control device, which is connected to the measuring device and to the actuator and, during the test, is designed to ascertain a corresponding longitudinal acceleration in real time from a measured rotational movement obtained from the measuring device and to transmit a control signal to the actuator based on the ascertained longitudinal acceleration.

The invention relates in particular to the ascertainment of the vehicle longitudinal acceleration in a situation similar to that on the road, i.e. as closely as possible to the conditions encountered during the actual use of the vehicle. The ascertainment will be performed on the vehicle test stand so that there is no need for a test drive. The vehicle test stand is preferably a total vehicle test stand. The actuator for moving the vehicle in a longitudinal direction is designed to transmit a longitudinal force to the vehicle; the vehicle covers a translation distance in the longitudinal direction as a result of the effect of the actuator. The longitudinal direction corresponds to the direction of travel of the vehicle when the vehicle is travelling in a straight line. The actuator is controlled in real time ("online"): the time between a change of the rotational movement and the reaction of the actuator is less than 500 ms, preferably less than 100 ms, in particular less than 50 ms. Specifically, the position of the actuator is preferably controlled, wherein the manipulated variable (for example the longitudinal force to be applied by the actuator) is modified or "disrupted" by the ascertained longitudinal acceleration. The longitudinal acceleration can be ascertained for example from the torque of the rotational movement. The control device of the vehicle test stand refers here to the entire system designed to control and monitor the test stand, which system may comprise one or more connected computers or control units.

Such a method and such a vehicle test stand are known from WO 2015/157788 A1. This publication, however, does not concern the assessment of driveability. Thus, only the longitudinal acceleration ascertained in accordance with the measured rotational movement on the basis of a vehicle model is available as longitudinal acceleration of the vehicle. This determined longitudinal acceleration may deviate from the actual longitudinal acceleration in the vehicle perceived by the driver, above all due to the simplification of the vehicle model, i.e. the incomplete modelling of the vehicle.

EP 1 085 312 A2 describes a method for analysing the driving behaviour of motor vehicles on a chassis dynamometer, wherein the longitudinal acceleration which is used to determine the driveability is ascertained from a sum signal of two superposed longitudinal acceleration signals. The first longitudinal acceleration signal is calculated from a rotational speed of the motor vehicle or the test stand, and the second is ascertained with the aid of an acceleration sensor secured to the motor vehicle. It is disadvantageous, however, that the movement of the motor vehicle relative to the chassis dynamometer, which movement is necessary in order to ascertain the second longitudinal acceleration signal, results in a difference between wheel and roller rotational speed which difference is not present on the road and thus falsifies the test result.

EP 0 846 945 B1, in the same field as the invention, likewise describes a method for analysing the driving behaviour of motor vehicles. It is assumed here that the parameter of the vehicle longitudinal acceleration is not available on the test stand, but can be measured only in the real driving mode on the road and, at best, can be simulated on the test stand from the rotational speed by means of a self-learning system.

An assessment of the driveability on the basis of the longitudinal acceleration measured on the vehicle on the road is also described in U.S. Pat. No. 4,169,370 A.

The object of the invention is to provide the most realistic possible longitudinal acceleration for the assessment of driveability in a method and a vehicle test stand of the kind described at the outset.

The method according to the invention of the kind described at the outset is characterised in that the vehicle is connected to an acceleration sensor (in particular a longitudinal acceleration sensor) and an acceleration signal of the acceleration sensor is detected during the test and a low-frequency longitudinal acceleration component is calculated based on the ascertained longitudinal acceleration and a position control loop for controlling the actuator, and the vehicle longitudinal acceleration is ascertained based on the detected acceleration signal and the calculated low-frequency longitudinal acceleration component. Accordingly, in a vehicle test stand according to the invention of the kind described at the outset, the control device is connected to an acceleration sensor in or on the vehicle and is designed, during the test, to detect an acceleration signal of the acceleration sensor, to calculate a low-frequency longitudinal acceleration component based on the ascertained longitudinal acceleration and a position control loop for controlling the actuator, and to ascertain the vehicle longitudinal acceleration based on the detected acceleration signal and the calculated low-frequency longitudinal acceleration component. On the whole, a vehicle longitudinal acceleration at which low-frequency components are also specified as realistically as possible, i.e. "as on the road", can thus be ascertained. This is then useful in particular if the limit frequency of the acceleration components simulated by the actuator is above 0.5 Hz, in particular above 1 Hz. The acceleration sensor is coupled to the vehicle, in particular to an element in the passenger compartment relevant for the assessment of driveability (for example a seat or a seat rail), and is designed to detect the acceleration of the vehicle or the element in question. The acceleration sensor may be installed or integrated in the vehicle by the vehicle manufacturer. The vehicle longitudinal acceleration is ascertained on the basis of a function dependent at least on the measured acceleration signal. In order to consider, apart from the rotational movement, also other forces originating from the vehicle which lead to low-frequency acceleration components the low-frequency longitudinal acceleration component is calculated based on a position control loop for controlling the actuator. The control device is designed, accordingly, to calculate the low-frequency longitudinal acceleration component based on a position control loop for controlling the actuator.

The actuator, which is formed for example by a linear motor, is not actuated on the basis of an arbitrary predefined test load or even a purely mathematically calculated acceleration, but instead dynamically from a measurement of the rotational movement of a wheel or a powertrain of the vehicle, i.e. in particular from a direct or indirect measurement of the torque exerted by the wheel, and in real time ("online"). Advantageously, a realistic reaction of the device under test to the vehicle control executed by the vehicle (accelerate, brake, change gear, etc.) can thus be simulated. Only by the correct reaction, i.e. a reaction corresponding to the real device under test, of the test stand to the effect experienced physically at the wheel or at the powertrain is a "vehicle application on the test stand" expedient and possible, because only then will changes, for example in the engine control unit, have an effect on the acceleration calculated online by the vehicle model and introduced by the actuator into the device under test, and thus on the subjective perception of the vehicle application engineer.

The exact longitudinal acceleration that the vehicle would perform on the road can be used on the test stand only to a very limited extent, since, for example in a full acceleration scenario, a travelled distance of more than 100 m would result after just a few seconds. As has been found, in the case of longer tests, for the control of the actuator the ascertained longitudinal acceleration can be converted or recalculated into a filtered acceleration in order to reduce a travelled translation distance as compared to a distance resulting from the ascertained longitudinal acceleration. The conversion into a filtered acceleration utilises the fact that the acceleration perceived by a person generally deviates from the physical acceleration. A conversion is thus preferably selected in order to approximate a subjectively correct feeling of acceleration and with minimisation of the distance travelled by the device under test.

For example, it has proven to be favourable if, when converting the acceleration, low-frequency components of the ascertained longitudinal acceleration are reduced. This process is based on the knowledge that only, or primarily, high-frequency components of the acceleration are relevant for the subjective human perception. In other words, relatively abrupt changes to the acceleration are primarily perceived, whereas a uniform acceleration or slow changes—if any—are perceived to a much smaller extent. In this context, low-frequency components are considered in particular to be components in the range of 1-2 Hz and below.

It is also advantageous if the ascertained longitudinal acceleration for conversion into the filtered acceleration is filtered by a high-pass filter, for example a high-pass filter of Bessel or Butterworth design, or preferably a first-order high-pass filter, wherein a time constant of the high-pass filter is preferably between 0.01 and 1 second, in particular approximately 0.1 seconds. Such a filtering of the longitudinal acceleration can be implemented relatively efficiently and enables a reaction in real time and an avoidance of significant latencies disrupting the subjective perception. Accordingly, in the case of the present vehicle test stand, it is advantageous if the control device comprises a high-pass filter for the ascertained longitudinal acceleration, for example a high-pass filter of Bessel or Butterworth design or preferably a high-pass filter of first order, wherein a time constant of the high-pass filter is preferably between 0.01 and 1 second, in particular approximately 0.1 seconds.

In order to further reduce the distance actually travelled by the vehicle in the test stand it is favourable if the deflection of the actuator is controlled to a constant setpoint position, in particular in the middle of an intended path of movement of the actuator. In this way a plurality of accelerations that are successive, but temporally interrupted or constant in part can be simulated in the same direction or with the same sign within a translation distance that is shorter on the whole, in particular within the same translation section. Here, the translation section is travelled quickly a number of times in the same direction in accordance with the acceleration, wherein, between the accelerations, the vehicle is moved back relatively slowly, and thus unnoticeably, to the starting position by the position control system, possibly as far as the constant setpoint position (target position). The setpoint position can be selected here in principle such that the expected accelerations can be realised. Accelerations in both directions (forwards or backwards, or acceleration or braking) are equally possible in the middle of the intended path of movement. If different accelerations or different acceleration speeds are expected depending on direction, the target position can of course be adapted accordingly to these expectations.

A particularly simple and reliable control can be attained if the deflection of the actuator is controlled by a position controller, preferably with a rise time between 0.05 and 5 seconds, in particular with a rise time of approximately 0.5 seconds. Similarly, it can be provided in the proposed vehicle test stand that the control device comprises a position controller for controlling the deflection of the actuator, preferably with a rise time between 0.05 and 5 seconds, in particular of approximately 0.5 seconds. A conventional PID controller or a cascade controller, for example with a speed controller embodied as a PI controller and with an upstream deflection controller embodied as a P controller, can be used as position controller.

In cooperation with the position control loop it is favourable if a component proportional to the filtered acceleration acts as disturbance variable on the position control loop, in particular if a component proportional to the filtered acceleration is added to a current manipulated variable value of the position control loop. With a known vehicle mass, a force corresponding to the portion of the filtered acceleration associated (as applicable in the case of a plurality of actuators) with the individual actuator is preferably added to the force predefined for the actuator, for example by a position controller. The filtered acceleration achieved by the actuator is thus superposed with an acceleration component from the position control loop, i.e. the low-frequency components of the ascertained longitudinal acceleration are replaced by the current manipulated variable values of the position controller. The position controller is preferably not set as precisely as possible, so that the additional force corresponding to a filtered acceleration can also be implemented by the actuator.

For example, the vehicle longitudinal acceleration in the simplest case can be ascertained by superposing the detected acceleration signal and the calculated low-frequency longitudinal acceleration component. Accordingly, the control device can be designed to ascertain the vehicle longitudinal acceleration by superposing the detected acceleration signal and the calculated low-frequency longitudinal acceleration component.

In principle the low-frequency longitudinal acceleration component can be assumed to be the complement of the filtered acceleration to the ascertained longitudinal acceleration.

In particular, the low-frequency longitudinal acceleration component can be calculated as the difference between the ascertained longitudinal acceleration and a high-frequency longitudinal acceleration component ascertained from a manipulated variable of the position control loop. Accordingly, the control device can be designed to calculate the low-frequency longitudinal acceleration component as the difference between the ascertained longitudinal acceleration and a high-frequency longitudinal acceleration component ascertained from a manipulated variable of the position control loop. The longitudinal force acting on the test stand is reproduced in the manipulated variable of the position control loop. The comprises, in particular, the force that on the road would lead to a low-frequency acceleration of the vehicle, and is superposed or partially compensated at the test stand by the position control loop and the effect of the at least one actuator. This force or the corresponding acceleration cannot be determined with the acceleration sensor, or can only be determined to a limited extent. This relates to, for example, structural vibrations generated by engine vibrations, which with this approach are automatically incorporated correctly in the vehicle longitudinal acceleration.

The manipulated variable can preferably be used for the calculation of the low-frequency longitudinal acceleration component which specifies the force to be applied by the actuator to the vehicle (for example the air-gap force of the actuator), wherein the high-frequency longitudinal acceleration component is calculated from the sum of the manipulated variables of the one or more actuators divided by the mass of the vehicle, or the control device is designed to calculate the high-frequency longitudinal acceleration component from the sum of the manipulated variables or the one or more actuators divided by the mass of the vehicle. What is meant here is the sum of the manipulated variables of those actuators that are designed to move the vehicle in the longitudinal direction.

The invention also relates to a method for ascertaining a vehicle longitudinal acceleration during a test of a vehicle in a vehicle test stand, wherein the vehicle test stand comprises at least one actuator for moving the vehicle in a longitudinal direction, wherein the vehicle is connected to an acceleration sensor, and wherein the method, during the test, comprises the following steps performed in real time:

measuring a rotational movement performed by a wheel or a powertrain of the vehicle;

ascertaining a longitudinal acceleration in accordance with the measured rotational movement;

actuating the at least one actuator based on the ascertained longitudinal acceleration; detecting an acceleration signal of the acceleration sensor;

calculating a low-frequency longitudinal acceleration component based on the ascertained longitudinal acceleration and a position control loop of the actuator; and ascertaining the vehicle longitudinal acceleration based on the detected acceleration signal and the calculated low-frequency longitudinal acceleration component.

The aforesaid steps can be performed at least partly in parallel. An output or display of the ascertained vehicle longitudinal acceleration can be provided as additional step. The advantageous variants of the method described further above apply similarly for this method. More specifically, one or more of the following steps can be added:

ascertaining a high-frequency longitudinal acceleration component from a manipulated variable of the position control loop; and calculating the low-frequency longitudinal acceleration component as the difference between the ascertained longitudinal acceleration and the ascertained high-frequency longitudinal acceleration component; in particular calculating a high-frequency longitudinal acceleration component from the sum of the manipulated variables of the one or more actuators divided by the mass of the vehicle, wherein the manipulated variables specify the force to be applied to the vehicle by the particular actuator; and calculating the low-frequency longitudinal acceleration component as the difference between the ascertained longitudinal acceleration and the calculated high-frequency longitudinal acceleration component;

ascertaining the vehicle longitudinal acceleration by superimposing the detected acceleration signal and the calculated low-frequency longitudinal acceleration component.

BRIEF DESCRIPTION OF THE FIGURES

The invention will be explained in further detail hereinafter on the basis of particularly preferred exemplary embodiments, to which the invention is not limited, however, and with reference to the drawings. Specifically, the drawings show schematically.

DETAILED DESCRIPTION

The technology of powertrain test stands has been further developed in recent years such that the device under test, i.e.

the vehicle 2 (also "DUT" for short), experiences exactly the same loads on what is referred to as a vehicle test stand 1 or total vehicle test stand (see FIG. 1) as on the road. A "vehicle application on the test stand" in which, instead of time-consuming and costly driving tests on a test track, the same tests can be performed on the test stand is thus made possible (see Pillas J., Kirschbaum F., Jakobi R., Gebhardt A., Uphaus F.: Model-based load change reaction optimization using vehicle drivetrain test beds. Conference proceedings of the 14th International Stuttgart Symposium, pages 857-867, 2014).

Figure 2B:
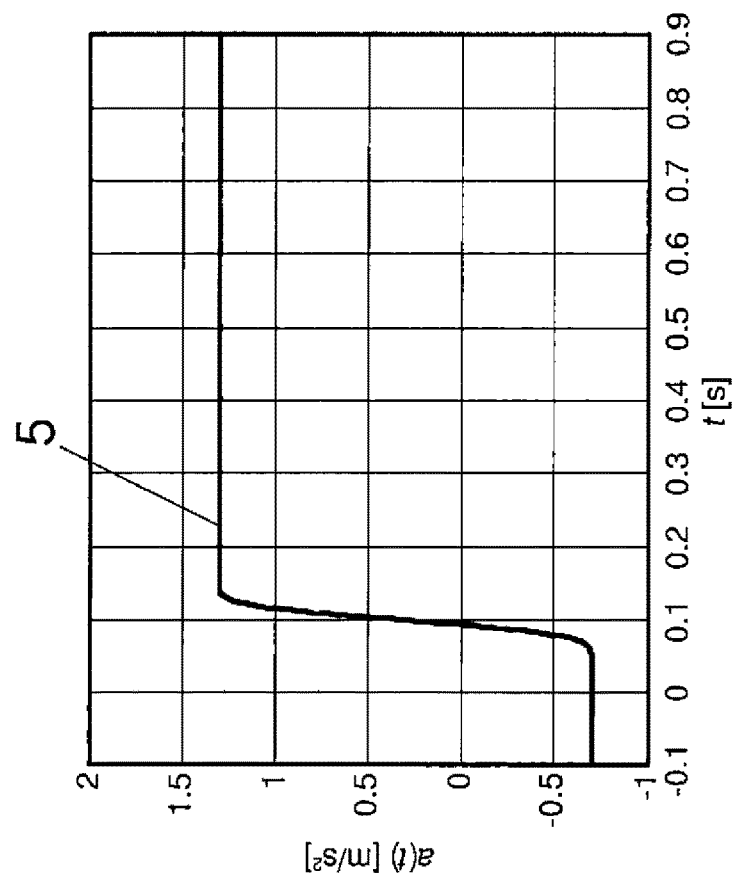
FIGS. 2a and 2b (simulated) the temporal progression of a vehicle longitudinal acceleration in a tip-in test, on the road (FIG. 2a) and calculated from a vehicle model (FIG. 2b)
Figure 2A:
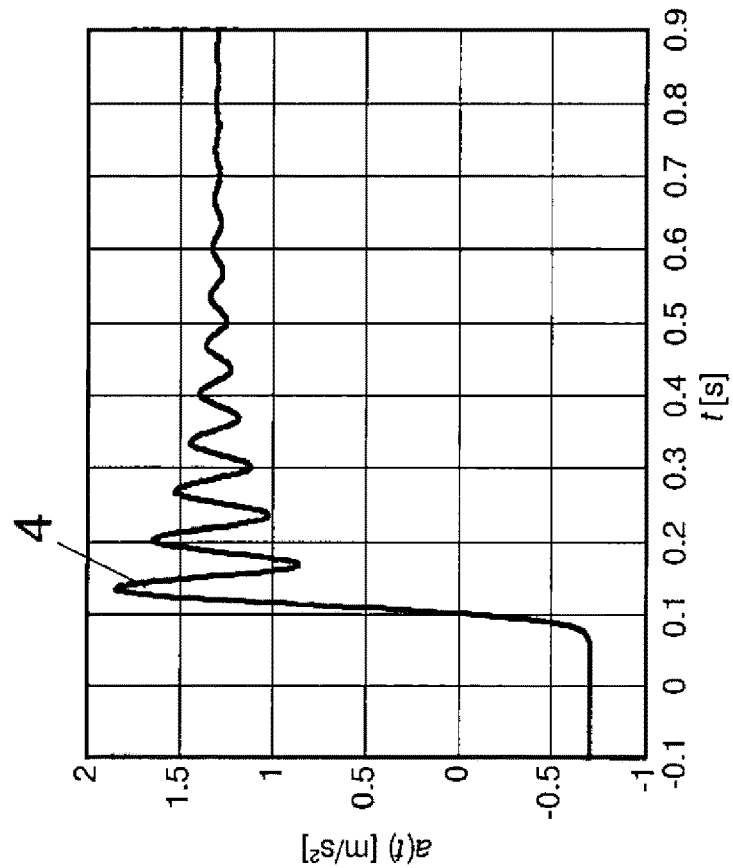

Here, mathematical models of the vehicle 2, of the wheels and of the tyres are also calculated online on the test stand, and these models are applied to the wheeled machines 3 on the basis of the calculated values. If a simple one-mass model is used as model 2' for the vehicle 2, however, it has been found that the longitudinal acceleration a calculated by the model 2' is too "smooth" on the test stand: In the case of an exemplary tip-in test (sudden increase in the acceleration pedal value), a fluctuating signal profile 4 (see FIG. 2a) is achieved on the road by the vehicle's own longitudinal acceleration sensor, whereas the longitudinal acceleration signal 5 calculated by the model 2' does not show this fluctuation at the test stand (see FIG. 2b). This difference between road measurement and test-stand measurement is problematic if an objective assessment of the driveability of the current vehicle application is to be performed on the basis of this signal profile.

The reason for the deviation of the longitudinal acceleration a calculated by the model 2' lies in the modelling of the vehicle 2 as a one-mass model. In fact, the vehicle 2 consists of a number of masses, which are connected to one another via various spring-damper elements. For example, the axle tree bolster may vibrate relative to the rest of the body and may contribute to the signal profile 4 shown in FIG. 2a. The present invention is based on the finding that, on the vehicle test stand 1, the corresponding parts of the real vehicle 2 provided on the total vehicle test stand can be used for the ascertainment of a realistic vehicle longitudinal acceleration $a_S$ instead of the simulation or in addition to the simulation. This presupposes that the vehicle test stand 1 comprises at least one actuator 6 for moving the vehicle 2 in a longitudinal direction, and, during the test, a rotational movement performed by a wheel or a powertrain of the vehicle 2 is measured in real time, a longitudinal acceleration a corresponding to the measured rotational movement is ascertained, and the at least one actuator 6 is actuated based on the ascertained longitudinal acceleration a, in particular on the basis of a high-frequency acceleration component $a_{HF}$ (also "filtered" or "subjective" acceleration). A corresponding vehicle test stand 1 is described for example in WO 2015/157788 A1 and can be realised in accordance with the exemplary embodiments disclosed there.

Figure 3:
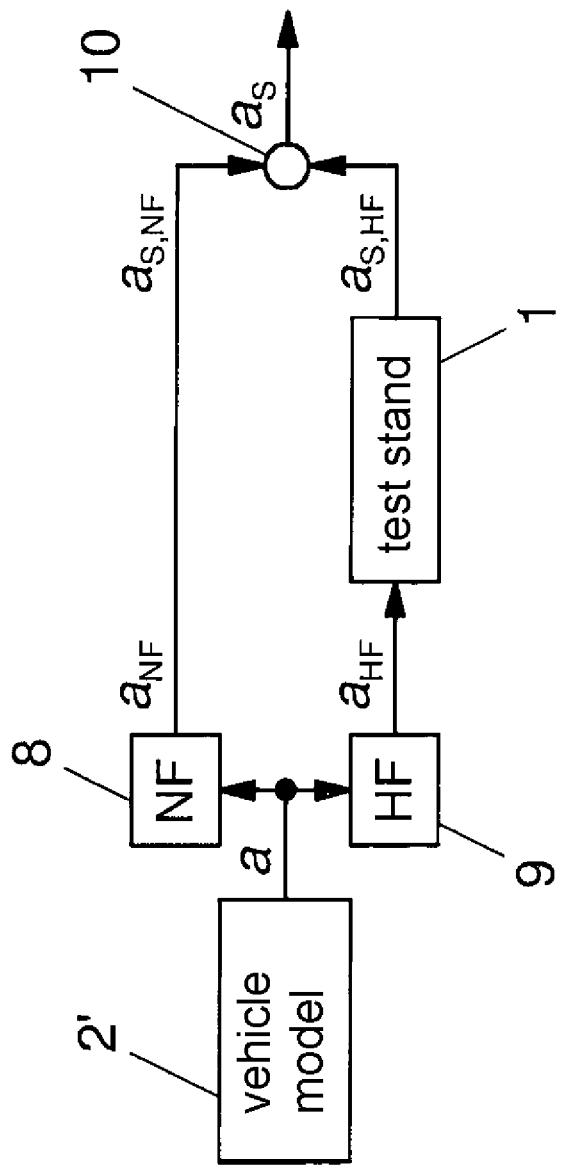
FIG. 3 a heavily simplified block diagram for ascertaining a vehicle longitudinal acceleration on a test stand according to FIG. 1.
Figure 5:
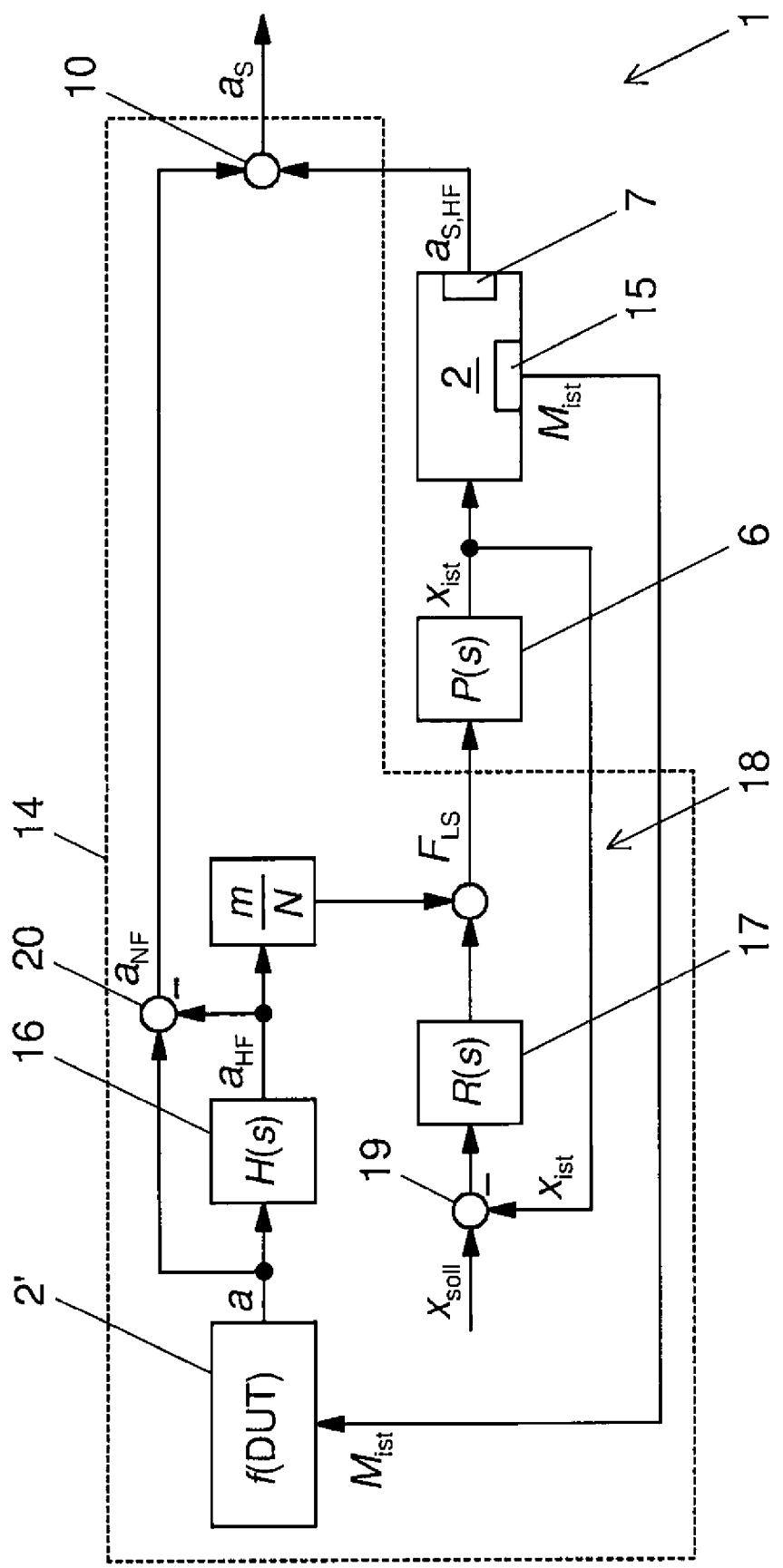
FIG. 5 a block diagram for ascertaining a vehicle longitudinal acceleration on a test stand with a control device for an actuator for transmitting a longitudinal force to a vehicle.

Proceeding from a vehicle test stand 1 of this kind, the present method provides that the vehicle 2 is connected to an acceleration sensor 7 (see FIG. 5). During the test the longitudinal acceleration a calculated by the model 2' is split into a low-frequency longitudinal acceleration component $a_{NF}$ and a high-frequency longitudinal acceleration component $a_{HF}$, for example with the aid of filters 8, 9 (see FIG. 3). The high-frequency longitudinal acceleration component $a_{HF}$ is applied at the test stand to the real vehicle 2 provided, via the actuators 6 (for example linear motors). During the test an acceleration signal $a_{S,HF}$ at or in the vehicle 2 is detected by means of the acceleration sensor 7. The acceleration signal $a_{S,HF}$ thus detected is then suitably superposed with the calculated low-frequency longitudinal acceleration component $a_{NF}$ so as to obtain the sought vehicle longitudinal acceleration $a_S$.

If only the low-frequency longitudinal acceleration component $a_{NF}$ were applied to the vehicle test stand 1 (which doesn't work due to the necessary distance), exactly the same profile $a_{S,NF}$ would be measured by the acceleration sensor 7, since the vehicle's internal vibration frequencies are higher. Thus, there is no need to apply the low-frequency longitudinal acceleration component $a_{NF}$ at the vehicle test stand 1, and the sought longitudinal acceleration signal $a_S$ can be obtained by superposition by means of addition 10:

$$a_S = a_{S,NF} + a_{S,HF} = a_{NF} + a_{S,HF}$$

Figure 4:
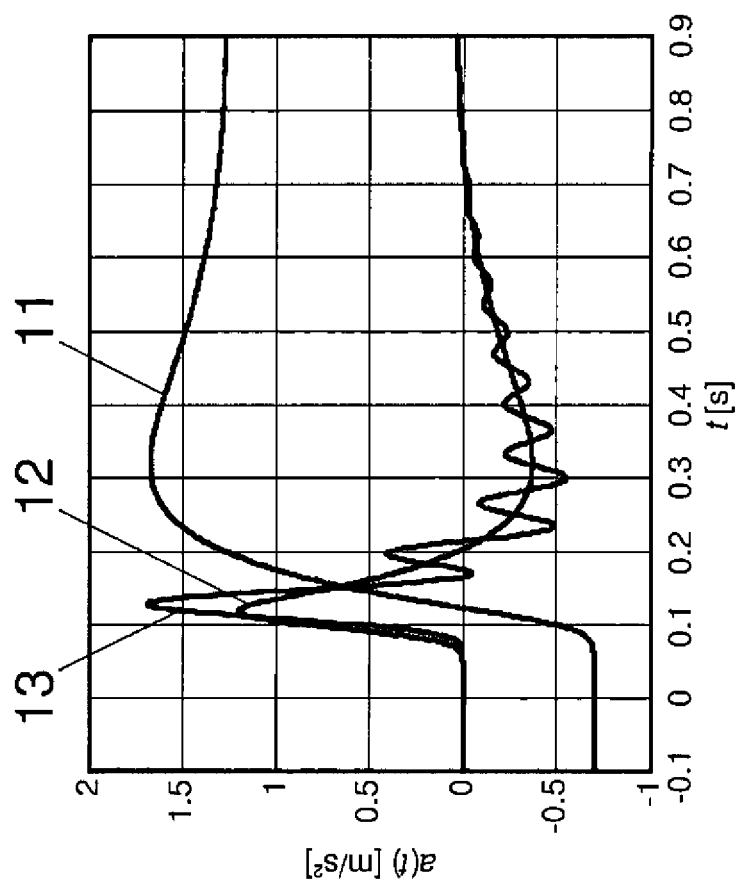
FIG. 4 the temporal progression of the signals in the block diagram according to FIG. 3.

FIG. 4 by way of example shows a signal profile 11 of the low-frequency longitudinal acceleration component $a_{NF}$, a signal profile 12 of the high-frequency longitudinal acceleration component $a_{HF}$ calculated by the model 2', and a signal profile 13 of the acceleration signal $a_{S,HF}$ measured on the test stand.

The low-frequency longitudinal acceleration component $a_{NF}$ can be assumed in the simplest case to be the complement of the high-frequency longitudinal acceleration component $a_{HF}$ to the ascertained longitudinal acceleration a. This case is shown in FIG. 5: this shows schematically a vehicle test stand 1 with a control device 14 for an actuator 6 of the vehicle test stand 1. The actuator 6 is formed by a linear motor (transmission function P(s)) for transmitting a longitudinal force to a vehicle 2 (DUT, or "device under test") connected to the vehicle test stand 1. In order to measure a rotational movement of a powertrain or a wheel of the vehicle 2, the control device 14 is connected to a measuring device 15, for example in the form of a torque sensor. The control device 14 is designed to firstly ascertain a longitudinal acceleration a of the vehicle 2 corresponding to the measured torque value $M_{ist}$ according to a model 2' of the vehicle 2. The longitudinal acceleration a thus ascertained is then modified in a high-pass filter 16, wherein low-frequency components of the acceleration a are eliminated, such that the high-frequency longitudinal acceleration component $a_{HF}$ corresponds to a subjective acceleration. The high-frequency longitudinal acceleration component $a_{HF}$ is weighted accordingly, i.e. multiplied by a vehicle mass m and divided by a number N of linear motors (oriented substantially in parallel) on the test stand. The resultant high-frequency acceleration force is added at the output of a position controller 17 as disturbance variable so to speak to the current manipulated variable value of the controller to form the desired air-gap force $F_{LS}$ of the actuator 6. The position controller 17 is designed for practically unnoticeable resetting of the vehicle 2, and therefore works only with slow or low-frequency accelerations. The low-frequency longitudinal acceleration component $a_{NF}$ of the ascertained longitudinal acceleration a damped or removed by the high-pass filter 16 is thus effectively replaced at the vehicle test stand 1 by the current manipulated variable value of the position controller 17. The entire processing starting with the measurement of the torque is performed in real time, i.e. without noticeable delays. The position controller 17 is part of a position control loop 18 with a position measurement of the actuator 6, which ascertains the current position $x_{ist}$ of the rotor of the actuator 6, and with a difference member 19, which compares the current position $x_{ist}$ with a constant, predefined setpoint position $x_{soll}$ and transmits the difference, which corresponds to a deflection of the rotor from the setpoint position $x_{soll}$, to the position controller 17. The position controller 17 ascertains a current manipulated variable value for the air-gap force $F_{LS}$ of the actuator 6 from the obtained deflection. The position controller 17, to this end, can comprise a deflection controller (for example as P controller) for ascertaining a setpoint speed and, connected thereto, a speed controller (for example as PI controller) for ascertaining the current manipulated variable value for the air-gap force FLS of the actuator. The low-frequency longitudinal acceleration component $a_{NF}$ corresponds to the difference 20 between the longitudinal acceleration a ascertained by the model 2' and the high-frequency longitudinal acceleration component $a_{HF}$.

Figure 1:
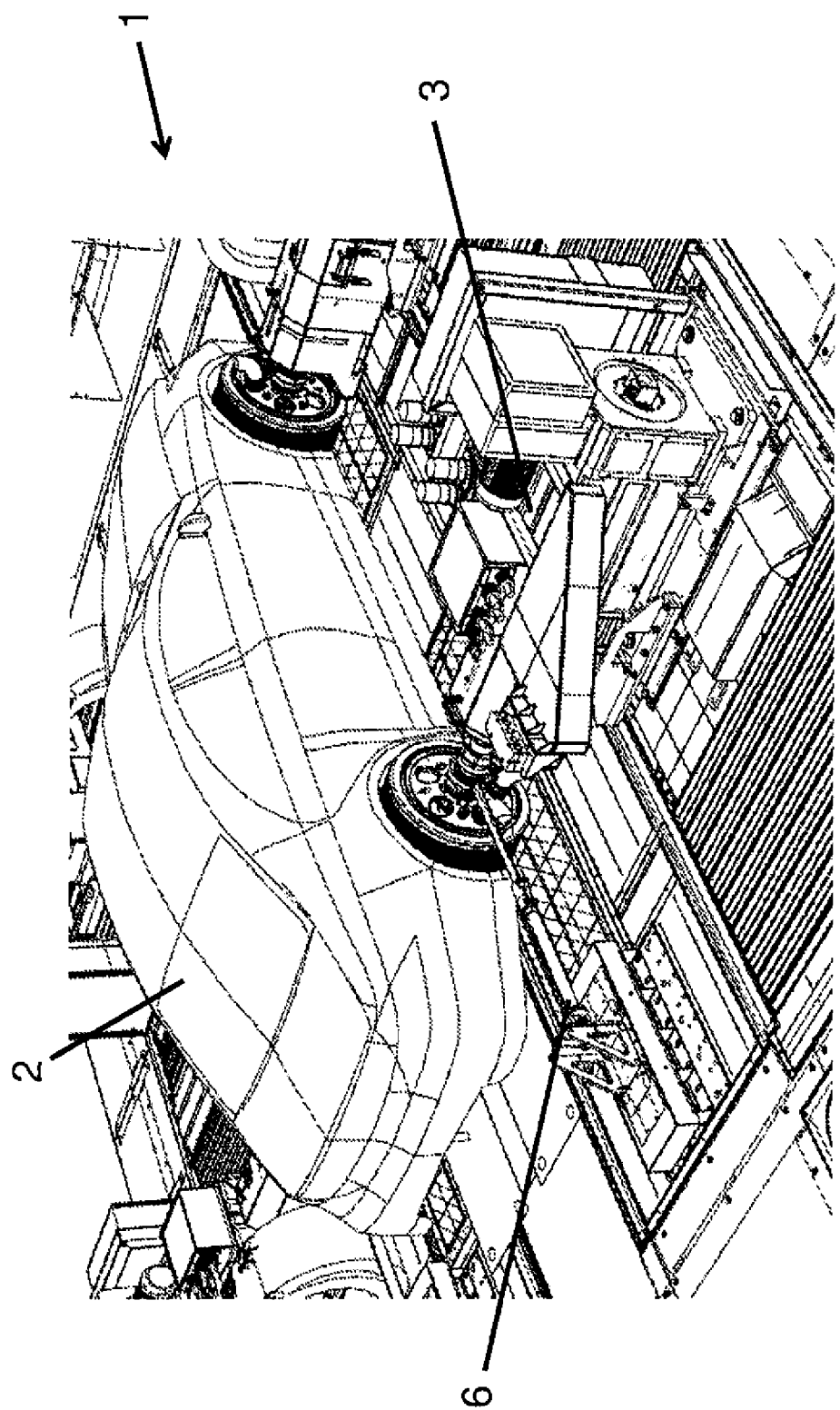
FIG. 1 a total vehicle test stand with actuators for moving the vehicle in a longitudinal direction.
Figure 6:
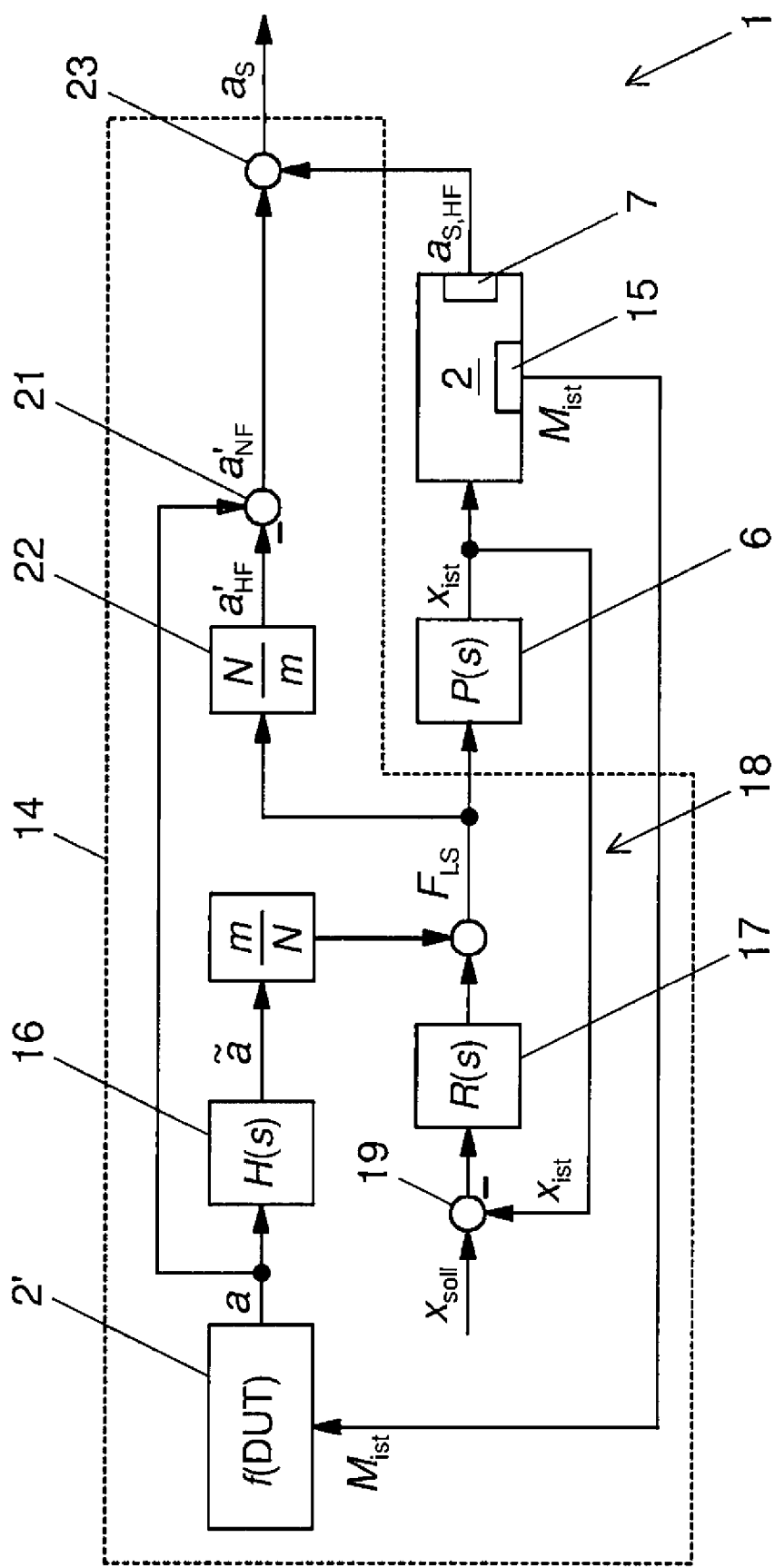
FIG. 6 a block diagram for ascertaining a vehicle longitudinal acceleration in accordance with the invention on a test stand with a control device for an actuator for transmitting a longitudinal force to a vehicle.

FIG. 6 shows the vehicle test stand 1 according to the invention with a control device 14 for calculating an alternative low-frequency longitudinal acceleration component a'NF. The test method utilises the fact that the actuators 6, as shown in FIG. 1, act on the wheels, and therefore the vehicle's internal dynamics from the wheel to the acceleration sensor 7 is excited. In order to take these dynamics into consideration, the control device 14 according to FIG. 6 is designed to calculate the low-frequency longitudinal acceleration component $a'_{NF}$ based on the ascertained longitudinal acceleration a and additionally based on the position control loop 18 of the actuator 6, specifically as the difference 21 between the ascertained longitudinal acceleration a and a modified high-frequency longitudinal acceleration component $a'_{HF}$ ascertained from the manipulated variable of the position control loop 18 (i.e. the air-gap force $F_{LS}$). This is calculated from the sum 22 (shown by way of simplification as factor N) of the manipulated variables of the one or more actuators 6 divided by the mass m of the vehicle 2. In other words, instead of the longitudinal acceleration components calculated purely from the model 2', the longitudinal forces calculated from the model 2' and modified by the position controller 17 are used on the tyres, with the advantages described at the outset. The vehicle longitudinal acceleration as is then ascertained as the sum 23 (i.e. by addition) of the previously detected acceleration signal $a_{S,HF}$ and modified low-frequency longitudinal acceleration component $a'_{NF}$.

The invention claimed is:

1. A method for ascertaining a vehicle longitudinal acceleration during a test of a vehicle in a vehicle test stand, comprising at least one actuator for moving the vehicle in a longitudinal direction,
wherein, during the test, a rotational movement which is carried out by a wheel or a powertrain of the vehicle is measured in real time, the vehicle longitudinal acceleration corresponding to the measured rotational movement is ascertained, and the at least one actuator is actuated based on the ascertained longitudinal acceleration,
wherein the vehicle is connected to an acceleration sensor
an acceleration signal of the acceleration sensor is detected during the test and a low-frequency longitudinal acceleration component is calculated based on the ascertained longitudinal acceleration and a position control loop for controlling the actuator, and
the vehicle longitudinal acceleration is ascertained based on the detected acceleration signal and the calculated low-frequency longitudinal acceleration component.

2. The method according to claim 1, wherein the vehicle longitudinal acceleration is ascertained by superposing the detected acceleration signal and the calculated low-frequency longitudinal acceleration component.

3. The method according to claim 1, wherein the low-frequency longitudinal acceleration component is calculated as the difference between the ascertained longitudinal acceleration and a high-frequency longitudinal acceleration component ascertained from a manipulated variable of the position control loop.

4. The method according to claim 3, wherein the manipulated variable specifies the force to be applied to the vehicle by the actuator, wherein the high-frequency longitudinal acceleration component is calculated from a sum of the manipulated variables of the at least one actuator divided by the mass of the vehicle.

5. A vehicle test stand for ascertaining a vehicle longitudinal acceleration during a test of a vehicle, comprising:
a measuring device for measuring a rotational movement of a wheel or of a powertrain of the vehicle,
an actuator for moving the vehicle in a longitudinal direction, and
a control device, which is connected to the measuring device and to the actuator and, during the test, is designed to ascertain a corresponding longitudinal acceleration in real time from a measured rotational movement obtained from the measuring device and to transmit a control signal to the actuator based on the ascertained longitudinal acceleration,
wherein the control device is connected to an acceleration sensor in or on the vehicle and is designed,
during the test, detect an acceleration signal of the acceleration sensor
calculate a low-frequency longitudinal acceleration component based on the ascertained longitudinal acceleration and a position control loop for controlling the actuator, and
ascertain the vehicle longitudinal acceleration based on the detected acceleration signal and the calculated low-frequency longitudinal acceleration component.

6. The vehicle test stand according to claim 5, wherein the control device is further configured to ascertain the vehicle longitudinal acceleration by superposing the detected acceleration signal and the calculated low-frequency longitudinal acceleration component.

7. The vehicle test stand according to claim 5, wherein the control device is further configured to calculate the low-frequency longitudinal acceleration component as the difference between the ascertained longitudinal acceleration and a high-frequency longitudinal acceleration component ascertained from a manipulated variable of the position control loop.

8. The vehicle test stand according to claim 7, wherein the manipulated variable specifies the force to be applied to the vehicle by the actuator, wherein the control device is further configured to calculate the high-frequency longitudinal acceleration component from the sum of the manipulated variables of the one or more actuators divided by a mass of the vehicle.

* * * * *